(12) United States Patent
Voigt et al.

(10) Patent No.: US 9,068,868 B2
(45) Date of Patent: Jun. 30, 2015

(54) MAGNETO-INDUCTIVE, FLOW MEASURING DEVICE

(75) Inventors: Frank Voigt, Weil am Rhein (DE); Thomas Zingg, Basel (CH); Gunther Bähr, Therwil (CH); Werner Wohlgemuth, Seewen (CH); Alexander Crnovic, Hinzlingen (FR)

(73) Assignee: Endress + Hauser Flowtec AG, Reinach (CH)

( * ) Notice: Subject to any disclaimer, the term of this patent is extended or adjusted under 35 U.S.C. 154(b) by 290 days.

(21) Appl. No.: 13/575,726

(22) PCT Filed: Dec. 13, 2010

(86) PCT No.: PCT/EP2010/069433
§ 371 (c)(1),
(2), (4) Date: Jul. 27, 2012

(87) PCT Pub. No.: WO2011/091899
PCT Pub. Date: Aug. 4, 2011

(65) Prior Publication Data
US 2012/0297891 A1    Nov. 29, 2012

(30) Foreign Application Priority Data
Jan. 29, 2010   (DE) .......................... 10 2010 001 393

(51) Int. Cl.
*G01F 1/58*    (2006.01)

(52) U.S. Cl.
CPC .............. *G01F 1/584* (2013.01); *G01F 1/586* (2013.01)

(58) Field of Classification Search
CPC ................................. G01F 1/586; G01F 1/584
USPC ......................................... 73/861.11–861.15
See application file for complete search history.

(56) References Cited

U.S. PATENT DOCUMENTS

| 4,825,703 A | 5/1989 | Kubota |
| 5,773,724 A * | 6/1998 | Unterseh .................... 73/861.12 |

(Continued)

FOREIGN PATENT DOCUMENTS

| DE | 3401377 A1 | 7/1985 |
| DE | 3545155 A1 | 7/1986 |

(Continued)

OTHER PUBLICATIONS

English Machine Translation of DE 10306522 A1, Mehlin et al., Aug. 26, 2004.*

(Continued)

*Primary Examiner* — Lisa Caputo
*Assistant Examiner* — Philip Cotey
(74) *Attorney, Agent, or Firm* — Bacon & Thomas, PLLC

(57) ABSTRACT

A magneto-inductive, flow measuring device for measuring flow of a measured medium through a measuring tube, comprising: at least a first coil assembly for accommodating a coil core is arranged in a first passageway. The coil core has a broadened part and a first stop, which is arranged between the measuring tube and the coil. The broadened part of the coil core in the assembled state of the first coil assembly lies against the first stop of the coil body and prevents shifting of the coil core relative to the coil body along the longitudinal axis of the coil core in a first direction facing away from the measuring tube. The coil body has a second stop, wherein the coil core is secured to the coil body with a securement element (which, in the assembled state, lies against the second stop of the coil body under a prestress along the longitudinal axis of the coil core between the first stop and the second stop of the coil body.

10 Claims, 4 Drawing Sheets

(56) References Cited

U.S. PATENT DOCUMENTS

| | | | |
|---|---|---|---|
| 5,866,823 A * | 2/1999 | Scarpa | 73/861.16 |
| 6,237,424 B1 * | 5/2001 | Salmasi et al. | 73/861.11 |
| 2007/0137311 A1 * | 6/2007 | Poortmann et al. | 73/861.08 |
| 2009/0025486 A1 * | 1/2009 | Cros et al. | 73/861.12 |
| 2009/0260453 A1 * | 10/2009 | Kawakami et al. | 73/861.12 |
| 2009/0308175 A1 * | 12/2009 | Magliocca et al. | 73/861.12 |
| 2010/0024569 A1 * | 2/2010 | Ehrenberg et al. | 73/861.12 |

FOREIGN PATENT DOCUMENTS

| | | |
|---|---|---|
| DE | 3511033 A1 | 10/1986 |
| DE | 19845346 A1 | 4/2000 |
| DE | 10306522 A1 | 8/2004 |
| DE | 69821474 T2 | 12/2004 |
| EP | 0990876 A1 | 4/2000 |
| WO | 2004/072590 A1 | 8/2004 |

OTHER PUBLICATIONS

German Search Report in corresponding German Application No. 10 2010 001 393.5, dated Nov. 17, 2010.

International Search Report in corresponding PCT Application No. PCT/EP2010/069433, dated Jun. 29, 2011.

International Preliminary Report on Patentability and Written Opinion of the International Searching Authority in corresponding PCT Application No. PCT/EP2010/069433, dated Aug. 9, 2012.

* cited by examiner

MAGNETO-INDUCTIVE, FLOW MEASURING DEVICE

TECHNICAL FIELD

The present invention relates to a magneto-inductive, flow measuring device for measuring flow of a measured medium through a measuring tube. The device includes at least a first coil assembly having a coil body for accommodating a coil core of a coil, wherein the coil is wound on the coil body and wherein the coil core is arranged in a first passageway of the coil body with a longitudinal axis of the coil core being coaxial with the coil, wherein the coil core has a broadened part and wherein the coil body has a first stop, which is arranged between the measuring tube and the coil, and wherein the broadened part of the coil core in the assembled state of the first coil assembly lies against the first stop of the coil body and prevents shifting of the coil core relative to the coil body along the longitudinal axis of the coil core in a first direction facing away from the measuring tube.

BACKGROUND DISCUSSION

Magneto-inductive, flow measuring devices utilize the principle of electrodynamic induction for volumetric flow measurement and are described in a large number of publications. Charge carriers of the medium moved perpendicularly to a magnetic field induce a measurement voltage in measuring electrodes arranged essentially perpendicular to the flow direction of the medium and perpendicular to the direction of the magnetic field. The measurement voltage induced in the measuring electrodes is proportional to the flow velocity of the medium averaged over the cross section of the measuring tube and, thus, proportional to the volume flow rate. If the density of the medium is known, the mass flow in the pipeline, respectively in the measuring tube, can also be determined. The measurement voltage is usually sensed via a measuring electrode pair, which, relative to the coordinate along the measuring tube axis, is arranged in the region of maximum magnetic field strength and where, thus, the maximum measurement voltage is to be expected.

WO 2004/072590 A1 discloses a magneto-inductive, flow measuring device having two coil bodies arranged oppositely on a measuring tube and having, in each case, a coil and a pole shoe as coil core. The pole shoe is held in a first passageway of the coil body along the coil axis. It includes a broadened part, which is so embodied that the measuring tube is contactable by the pole shoe approximately gap-freely. The coil bodies are mutually biased by means of two field guide-back elements. In this way, the respective pole shoes are pressed against the measuring tube.

SUMMARY OF THE INVENTION

An object of the invention is to provide a cost effectively manufactured, modularly constructed, magneto-inductive measuring device.

The object is achieved by the magneto-inductive, flow measuring device as defined in claim 1. Further developments and embodiments of the invention are set forth in the dependent claims.

The invention can be embodied in numerous forms. Some of these will be explained below in greater detail in conjunction on the appended drawing. Equal elements are provided in the figures with equal reference characters.

DETAILED DISCUSSION IN CONJUNCTION WITH THE DRAWINGS

Figure 1:
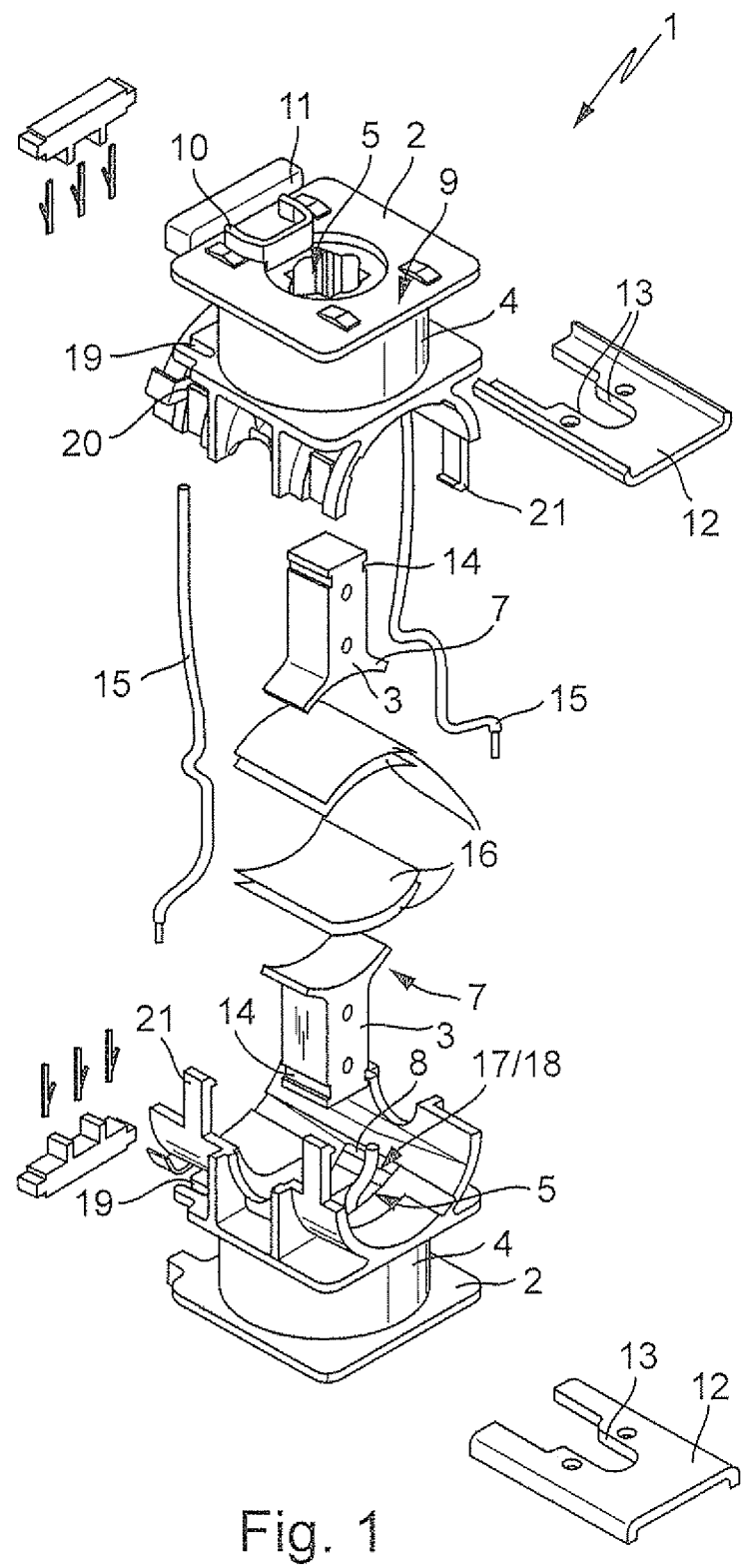
FIG. 1 two, identical coil arrangements of the invention in an exploded view.

FIG. 1 shows two, equally constructed, coil assemblies 1 of a magneto-inductive, flow measuring device of the invention. Such a flow measuring device is applied e.g. in process measurements technology for measuring flow of a measured medium through a measuring tube (not shown in FIG. 1). Each coil assembly 1 comprises a coil body 2 for accommodating a coil core 3 of a coil 4, wherein the coil 4 is wound on the coil body 2. The coil core 3 is arranged in a first passageway 5 of the coil body 2 coaxially with the coil 4. Coil core 3 is shiftably guided along its longitudinal axis in the passageway at least in one direction in the operationally ready state essentially perpendicular to a measuring tube longitudinal axis.

According to the invention, the coil core 3 has at least a first broadened part 7. In this example, the broadened part of the coil core 3 forms a pole shoe. The pole shoe serves for field guidance and is correspondingly formed. The coil core 3 performs here, thus, the function of a coil core and the function of a pole shoe, especially for field line guidance in the measuring tube. This component could thus here be alternatively also referred to as a pole shoe. The broadened part 7 has here the shape of a tube, or pipe, section, in order that a measuring tube can be flushly contacted. The curvature and size are selected for a good fit with the measuring tube. The broadened part 7 has, in this case, a greater cross section, transversely to the longitudinal axis of the coil core 3, than the passageway 5 in the coil body 2. Therefore, the broadened part 7 does not fit through the passageway 5 of the coil body 2. The coil body 2 has a first stop 8, especially on a side of the coil 4 facing the measuring tube. The stop 8 is thus arranged on the coil body 2 in this example between measuring tube 6 and the coil 4. The broadened part 7 and the stop 8 are, in such case, so formed that the broadened part 7 of the coil core 3, or the pole shoe, lies, in the assembled state of the first coil assembly 1, against the first stop 8 of the coil body 2. A shifting of the coil core 3 relative to the coil body 2 along the longitudinal axis of the coil core 3 in a first direction facing away from the measuring tube 6 is thus prevented thereby. The stop 8 has especially essentially the shape of the broadened part 7, so that the broadened part 7 lies flushly against the stop 8. For such purpose, a depression could be provided in the coil body 2.

According to the invention, the coil body 2 has a second stop 9 on a side of the coil body 2, and therewith also on a side of the coil 4, facing away from the measuring tube 6. Capable of being applied to this second stop 9 is a securement element 12. The securement element 12 is, in such case, so interlockingly connected with the coil core 3 by shape and/or by force, e.g. friction, that the coil core 3 is secured to the coil body 2 under an axial stress, thus a stress acting in the direction of the longitudinal axis of the coil core 3. The coil core 3 is, thus, secured to the coil body 2 with a securement element 12, which, in the assembled state, lies against the second stop 9 of the coil body 2, under a prestress occurring at least in the region of the coil 4. The stress acts, thus, at least in the region of the coil 4, especially between the first stop 8 and the second stop 9 of the coil body 2. The first stop 8 lies here outside of, respectively borders, passageway 5 of the coil body 2. Since, here, the coil core is formed as a pole shoe, the broadened part 7 is localized on a first end of the coil core 3 facing the measuring tube in the assembled state. As a simplification, coil core 3 could be referred to as T- or Y-shaped. Through the so described seating, the coil core 3 is positioned in defined manner in the coil body 2. The guiding in the passageway 5 prevents excessive shifting perpendicular to the longitudinal axis of the coil core 3. The prestress between the two stops 8 and 9 prevents shifting along the longitudinal axis relative to the coil body 2.

The prestress and the securement by means of the securement element 12 is achieved, for example, by features including that the coil core 3 has a groove 14 and that the securement element 12 has at least one projection 13 fitting into groove 14, respectively into the groove 14 of the coil core 3, wherein coil core 3 and securement element 12 are connected via a shape interlocking connection of groove 14 and projection 13 with one another. Securement element 12 can, in such case, be embodied in the form of a sheet with corresponding cutouts, as drawn. Thus, also through the elasticity of the securement element 12 and the broadened part 7 of the coil core 3, the prestress is brought about in the coil core 3. Groove 14 is especially arranged on the second end of the coil core 3 lying opposite its first end.

If the shown securement element 12 is pushed with its projections 13 into the grooves 14 of the coil core 3, it lies against the second stop 9 of the coil body 3, when the coil core 3 is inserted in the passageway of the coil body 2. In order to secure it against a shifting in the two other spatial directions perpendicular to the longitudinal axis of the coil core 3, the coil body 2 includes a third stop 10 and a fourth stop 11, wherein the securement element 12 in the assembled state lies against the third and the fourth stops 10 and 11, which prevents shifting of the securement element 12 in a second direction, perpendicular to the first direction and shifting of the securement element 12 in a third direction, perpendicular to the first and second directions. In this example of an embodiment, thus, two stops 10 and 11 are utilized for positional definition of the securement element 12. In the case of a conical cavity in the securement element and a correspondingly formed stop on the coil body, only one stop would be sufficient, in order to prevent shifting of the securement element in a second direction, perpendicular to the first direction and a shifting of the securement element in a third direction, perpendicular to the first and second directions.

Further shown are two pole sheets 16, which, in the assembled state of the magneto-inductive, flow measuring device, are arranged, approximately air gap freely, between coil core 3 and measuring tube 6. Alternatively, the provision of only one pole sheet is also possible. Also, the application of three or more pole sheets should not be excluded. The pole sheets 16 function for magnetic field guidance in the measuring tube. Therefore, the pole sheets 16 and the coil core 3, or the pole shoe, are to be so dimensioned that the contact area of the two assemblies is very large and as gap free as possible. Naturally, the coil body 2 is to be designed correspondingly, especially when each pole sheet 16 is to be separately snapped into a depression 17, 18 provided therefor in the coil body 2. Each pole sheet 16 is secured in its own depression 17, 18 in the coil body, e.g. by being snapped in. Unaffected thereby, the contact areas of the pole sheets 16 with the coil core 3, or the pole shoe, and the measuring tube should be as large and as gap free as possible.

For the magneto-inductive, flow measuring device, two coil assemblies 1 are arranged on oppositely lying sides of a measuring tube. In such case, the coils 4 are so connected that the magnetic fields produced by them point in a common direction, especially the field lines of the produced magnetic fields point in the first direction along the longitudinal axes of the coaxial coil cores 3. Since involved here are two fundamentally identical coil assemblies 1 with equal components and complementary interfaces, which, thus, fulfill equal functions, and since also the coils 4 of the two coil assemblies 1 are equally constructed, the coils 4 must be correspondingly connected. They lie essentially in two approximately parallel planes rotated by 180° relative to one another. The coil assemblies 1 are constructively so embodied that they are mountable only in a predetermined manner, as subsumed under the term poka-yoke.

The first coil assembly 1 and the second coil assembly 1 are especially shape-interlockingly connected with one another. Engagement hooks 21 engage in therefor provided and designed, respectively dimensioned, receptacles 20 of the respective connection partners, thus, in each case, of the other coil assembly. This can occur with a small prestress coaxially with the longitudinal axis of the coil core 3, this meaning thus that the coil bodies are connected by force, e.g. frictionally, interlockingly with the measuring tube. Since the coil bodies are, however, manufactured, for example, of plastic, this prestress could be lost because of creep in the plastic over a certain period of time. Alternatively, field guide-back sheets are placed on the coil bodies 2, which press the coil bodies 1 on the measuring tube and make the connection therewith by force, e.g. friction, interlocking. The coil bodies are in the two cases so embodied that they contact the measuring tube virtually free of air gaps. The assembled coil assemblies 1 are secured by means of the electrodes of the electrode assemblies installed in the measuring tube, or applied to the measuring tube, against rotation about, and shifting along, a longitudinal axis of the measuring tube.

Each coil body 2 includes, moreover, in this example of an embodiment, at least one cable guide 19, here in the form a groove and a cable catch, for guiding a cable, so that the guided cable of predetermined length does not exceed a predetermined maximal separation from the coil body 2. This cable guide 19 serves especially for guiding the coil cable (not shown in this figure). Another function of the cable guide 19 is for securing the cable against unwinding of the coil. Another cable guide can be provided in the coil bodies 1, in order to lead cable 15 of a measurement transmitter to the electrodes. For example, these cables 15 are guided in the passageway 5, especially in a supplemental cavity in the passageway 5.

Figure 2:
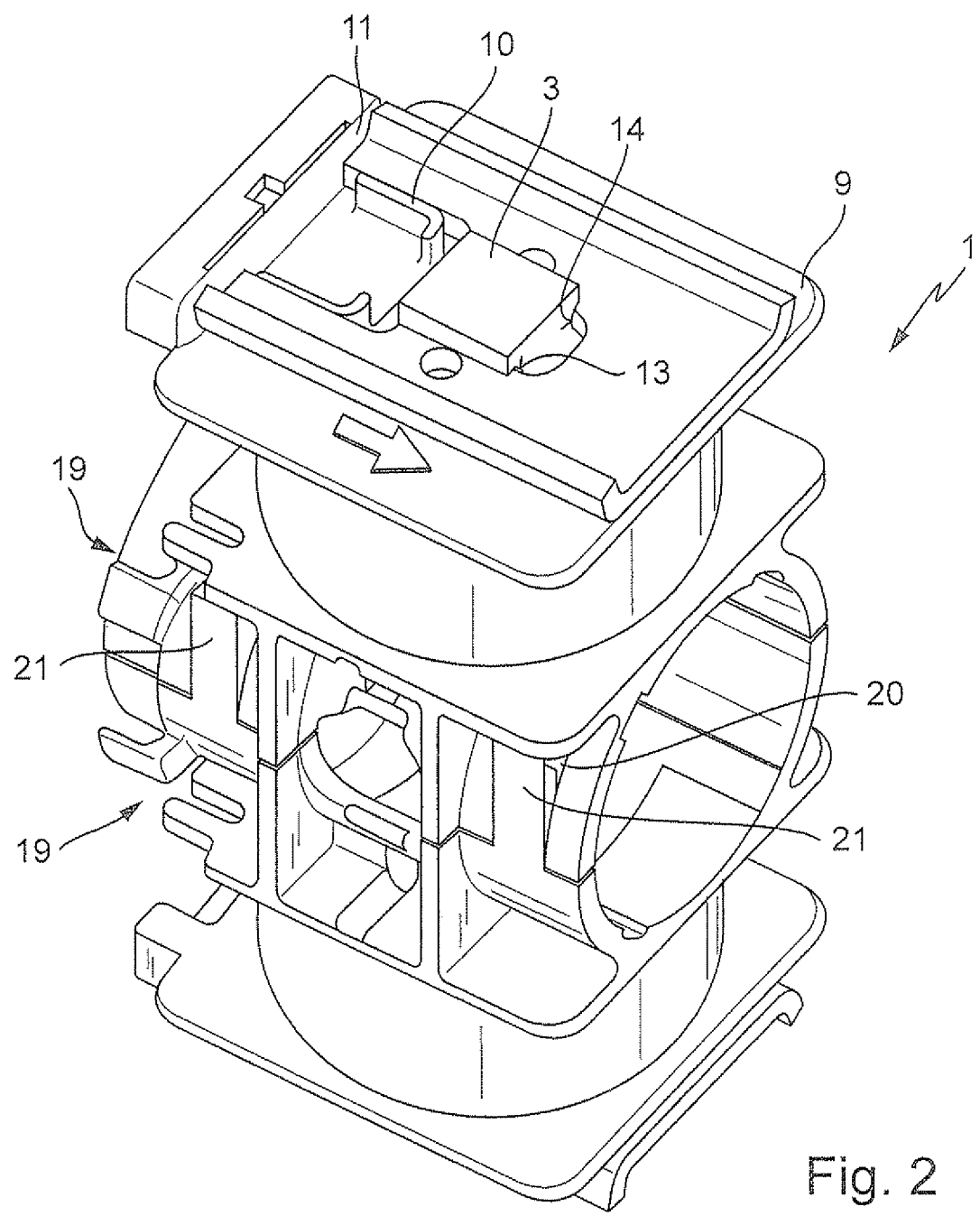
FIG. 2 perspectively, two, identical coil arrangements of the invention in the assembled state.

FIG. 2 illustrates two mounted coil assemblies 1. Located between the two coil assemblies 1 in the operationally ready state of the magneto-inductive measuring system is the measuring tube. The measuring tube is not shown in FIG. 2, in order to simplify the drawing. Visible is the cable guide 19 in the form, in each case, of a groove and a cable catch. Here, too, illustration of the guided cable is omitted for reasons of perspicuity. The cable would simply be inserted into the cable guide 19.

Likewise visible is the assembled securement element 12, which lies against the second, third and fourth stops 9, 10 and 11. As a result, securement element 12 is only removable in the direction of the arrow. The projections 13 sit in the grooves of the coil core 3 and form a projection in groove connection. The engagement hooks 21 of the one coil assembly 1 engage in the receptacles 20 of the other coil assembly 1.

Figure 3:
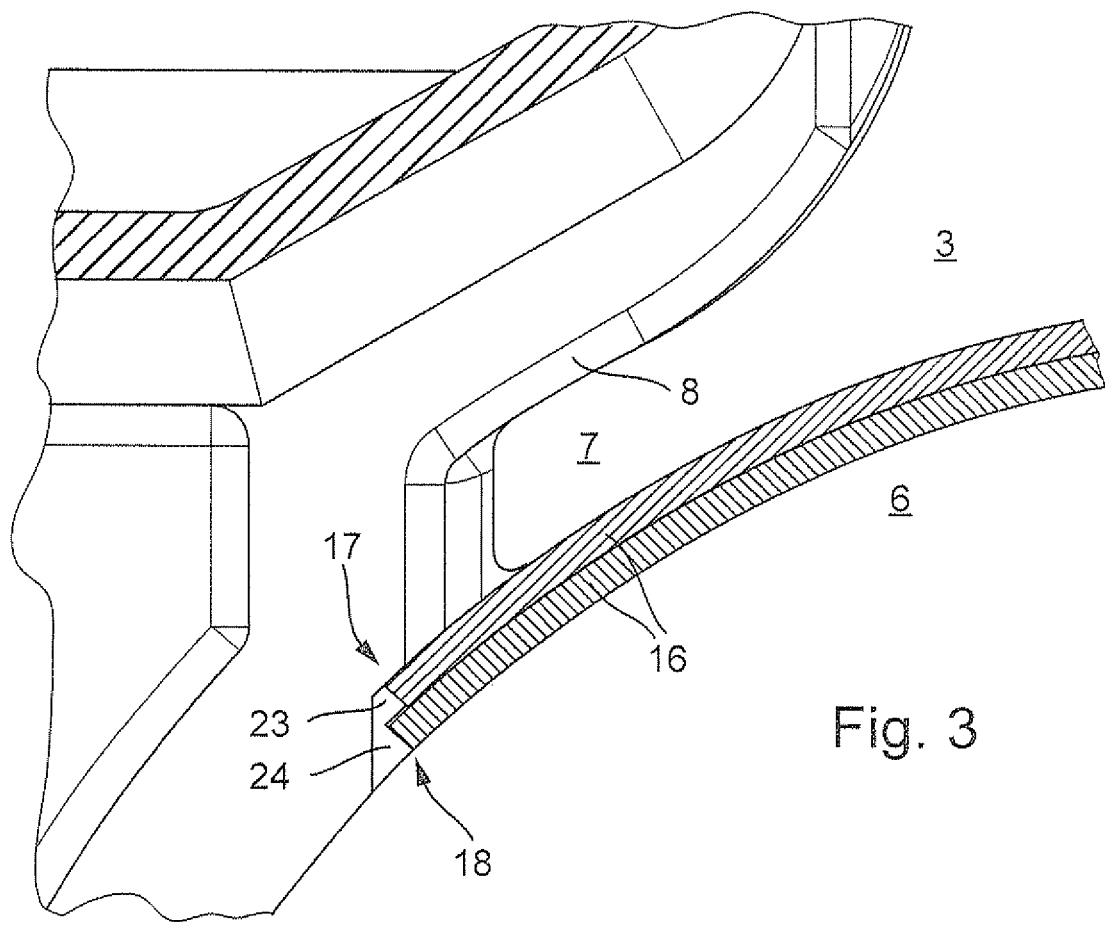
FIG. 3 a portion of a coil arrangement of the invention with assembled pole sheets, in cross section.

FIG. 3 shows a partial cross section through the part of a coil assembly facing the measuring tube in an assembled magneto-inductive, flow measuring device having two pole sheets 16. The coil core 3, as a curved pole shoe and with tubular shape, at least on the end facing the measuring tube 6, lies with its broadened part 7 against the first stop 8 of the coil body 2. The two pole sheets 16 are arranged between the coil core 3 and the measuring tube 6. They form a virtually gap-free bridge between coil core 3 and measuring tube 6. In such case, each of the pole sheets 16 is held in its own depression 17, 18. The depressions 17, 18 in the respective coil bodies 1 are curved surfaces matched to the contour of the measuring tube 6 and are terminated with steps 23, 24. Thus, it is possible to snap each of the two pole sheets 16 into its depression 17, 18. In this way, each of the pole sheets 16 is held prestressed in a defined position.

Figure 4:
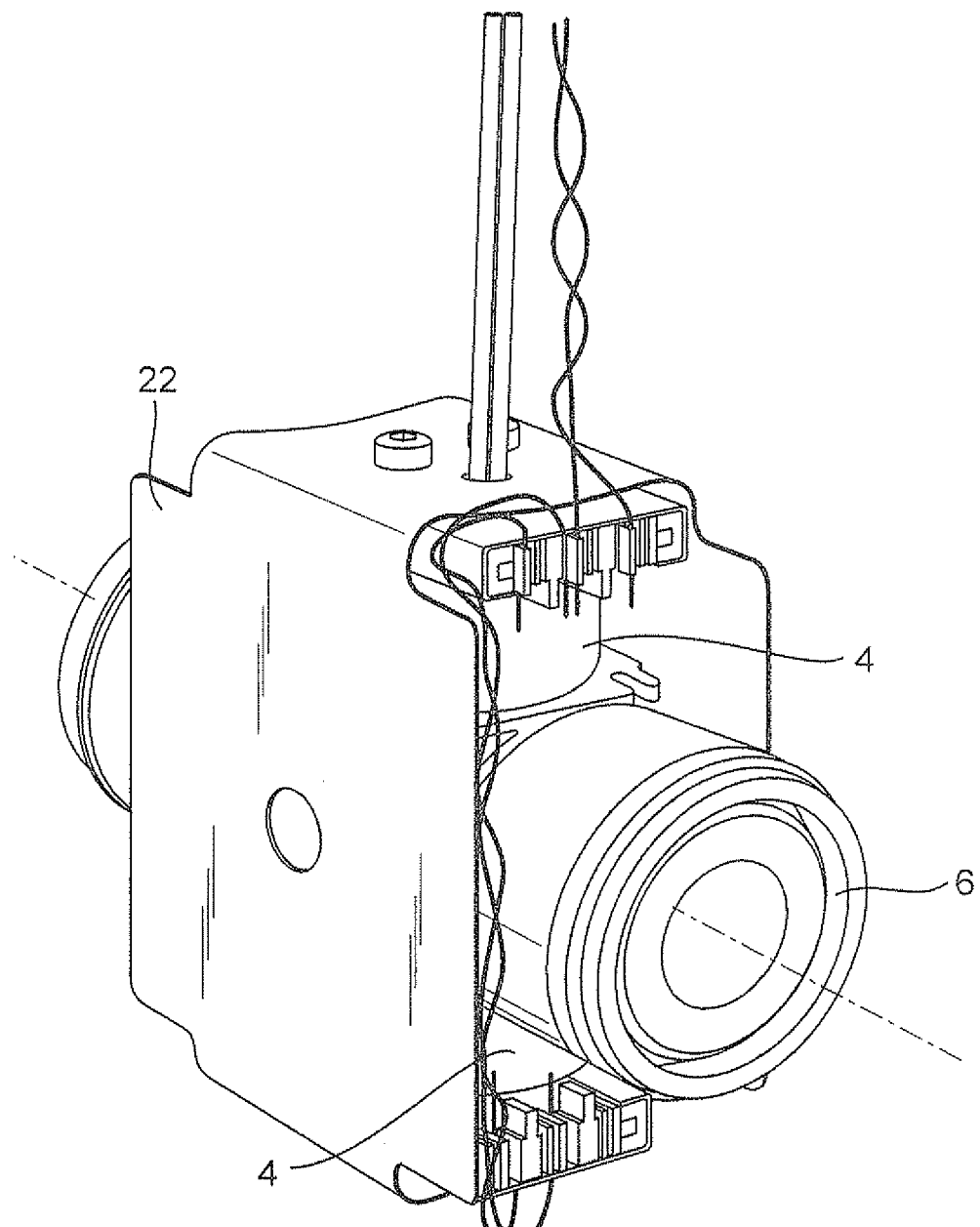
FIG. 4 a magneto-inductive, flow measuring device of the invention.

FIG. 4 shows a fully assembled sensor of a magneto-inductive, flow measuring device of the invention. The two coil assemblies with the coils 4 are mounted on a measuring tube 6 and are surrounded by field guide-back sheets 22, which fulfill two functions. On the one hand, they serve for the orientation and guiding of the field lines of the magnetic field, especially for resisting so called crosstalk, thus the acting of the magnetic field on another magneto-inductive, flow measuring device in the immediate vicinity, and for avoiding, thereby, the influencing of the measurement of the other magneto-inductive, flow measuring device. On the other hand, they also enable the pressing of the coil assemblies against the measuring tube 6.

The invention claimed is:

1. A magneto-inductive, flow measuring device for measuring the flow of a measured medium through a measuring tube, comprising:
   at least a first coil assembly having a coil body for accommodating a coil core of a coil, said coil is wound on said coil body and said coil core is arranged in a first passageway of the coil body with a longitudinal axis of said coil core being coaxial with said coil; and
   a securement element, wherein:
   said securement element provides a fixation of the coil core to the coil body;
   said coil core has a broadened part;
   said coil body has a first stop, which is arranged between the measuring tube and said coil;
   said broadened part in the assembled state of said at least a first coil assembly lies against said first stop and prevents shifting of said coil core relative to said coil body along the longitudinal axis of said coil core in a first direction facing away from the measuring tube;
   said coil body has a second stop on a side of said coil body facing away from the measuring tube; and
   said coil core is secured to said coil body with said securement element, which, in the assembled state, lies against said second stop under a prestress along the longitudinal axis of said coil core between said first stop and said second stop.

2. The magneto-inductive, flow measuring device as claimed in claim 1, wherein:
   said coil core is broadened to form a pole shoe.

3. The magneto-inductive, flow measuring device as claimed in claim 1, wherein:
   said coil core has a groove and said securement element has at least one projection fitting in said groove of said coil core; and
   said coil core and said securement element are connected with one another via a shape interlocking connection of said groove and said projection.

4. The magneto-inductive, flow measuring device as claimed in claim 1, wherein:
   said coil body has at least a third stop; and
   said securement element in the assembled state lies against said third stop, whereby shifting of said securement element in a second direction, perpendicular to the first direction, is prevented and whereby shifting of said securement element in a third direction, perpendicular to the first and second directions is prevented.

5. The magneto-inductive, flow measuring device as claimed in claim 1, further comprising:
   at least one pole sheet arranged between said coil core and the measuring tube.

6. The magneto-inductive, flow measuring device as claimed in claim 5, wherein:
   each pole sheet is separately snapped into a depression provided therefor in said coil body in the assembled state of said coil body.

7. The magneto-inductive, flow measuring device as claimed in claim 1, further comprises:
   a second coil assembly, wherein:
   said at least a first coil assembly and said second coil assembly are arranged lying oppositely against the measuring tube; and
   said coils are so connected that the magnetic fields produced by them point in a common direction.

8. The magneto-inductive, flow measuring device as claimed in claim 7, wherein:
   said at least a first coil assembly and said second coil assembly are connected with one another shape-interlockingly under prestress coaxially with the longitudinal axis of said coil core.

9. The magneto-inductive, flow measuring device as claimed in claim 7, wherein:
   said at least a first coil assembly and said second coil assembly are essentially complementarily constructed.

10. The magneto-inductive, flow measuring device as claimed in claim 1, wherein:
   said coil body has at least one cable guide for guiding a cable, so that the guided cable of a predetermined length does not exceed a predetermined separation from said coil body.

\* \* \* \* \*